(12) United States Patent
von Schroeter

(10) Patent No.: US 6,329,612 B1
(45) Date of Patent: Dec. 11, 2001

(54) INVALID HOISTS

(75) Inventor: Philip von Schroeter, Haresfield (GB)

(73) Assignee: Arjo Limited, Gloucestershire (GB)

( * ) Notice: Subject to any disclaimer, the term of this patent is extended or adjusted under 35 U.S.C. 154(b) by 0 days.

(21) Appl. No.: 09/496,593

(22) Filed: Feb. 2, 2000

(30) Foreign Application Priority Data

Feb. 10, 1999 (GB) .................................................. 9902859

(51) Int. Cl.⁷ .......................... G01G 19/52; G01G 19/14; B66C 1/40; A61G 7/10
(52) U.S. Cl. .......................... 177/144; 177/147; 177/151; 177/255; 177/DIG. 9; 5/86.1
(58) Field of Search ..................................... 177/144, 146, 177/147, 151, 152, 153, 255, DIG. 9; 5/83.1, 86.1, 87.1, 85.1

(56) References Cited

U.S. PATENT DOCUMENTS

| | | | |
|---|---|---|---|
| 3,998,284 | * 12/1976 | James ..................................... | 177/144 |
| 4,799,562 | 1/1989 | Burrows et al. ....................... | 177/144 |
| 5,600,104 | * 2/1997 | McCauley et al. .................... | 177/187 |
| 5,892,180 | * 4/1999 | Carey .................................... | 177/144 |
| 6,201,195 | * 3/2001 | Cary ...................................... | 177/144 |

\* cited by examiner

*Primary Examiner*—Randy W. Gibson
(74) *Attorney, Agent, or Firm*—Young & Thompson

(57) ABSTRACT

An invalid hoist comprises a mast, a lifting arm which can be raised and lowered by telescopically extending and retracting the mast and/or by raising and lowering a carriage, which may support the lifting arm, relative to the mast, and a load cell on the lifting arm for providing a signal representative of the weight of a person being lifted. The lifting arm is connected to the mast or the carriage by an arrangement which allows the lifting arm to be displaced angularly in a vertical plane against a spring force in order to maintain the load cell in a constant orientation as a vertical load is applied to the lifting arm.

9 Claims, 3 Drawing Sheets

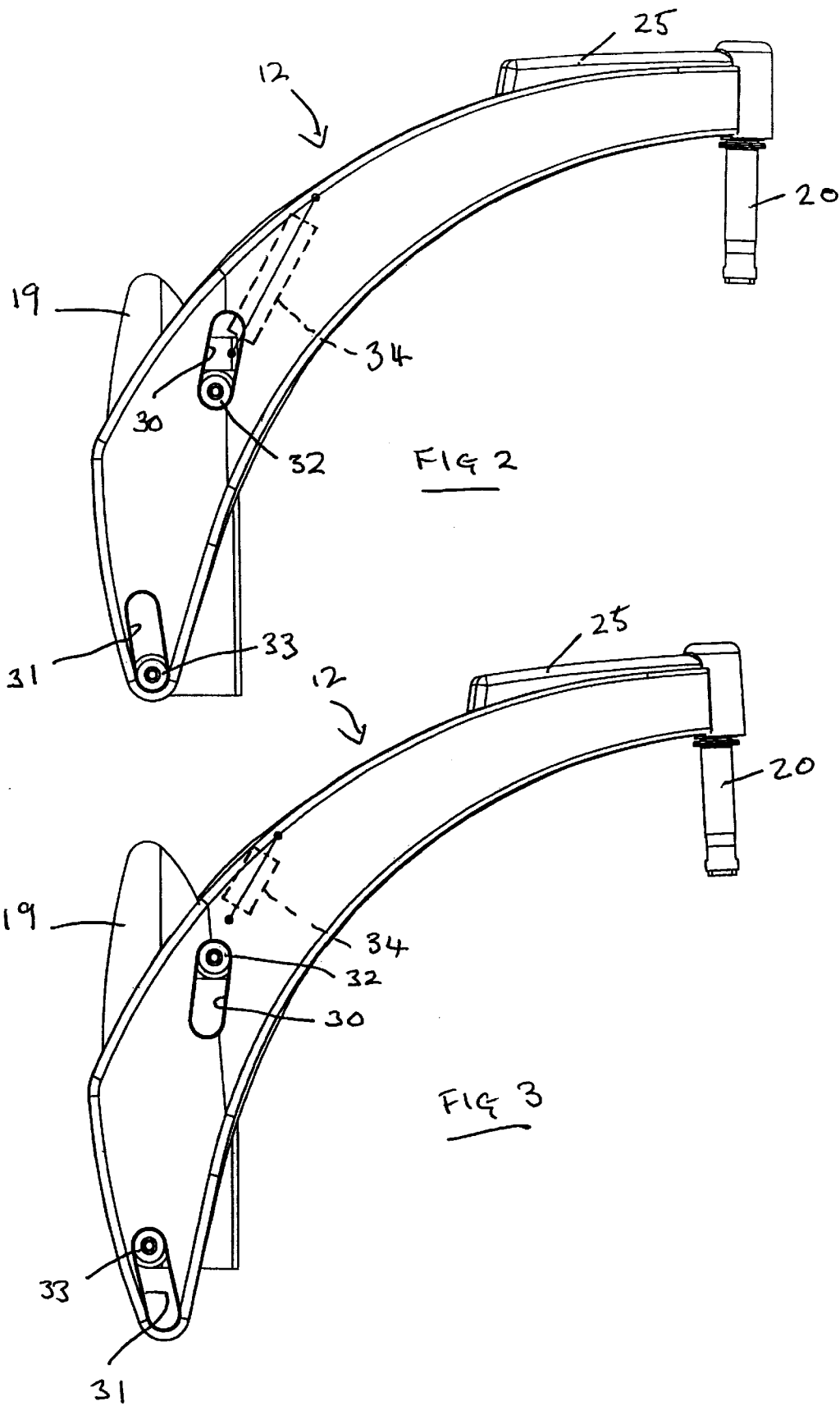

INVALID HOISTS

This invention relates to invalid hoists.

Some known invalid hoists comprise a mast, a lifting arm supported by the mast and a sling hanger supported by the lifting arm for supporting a full body support sling. Quite commonly, the lifting arm is secured to a carriage which can be raised and lowered relative to the mast. Additionally or alternatively, the mast is telescopically extendible and retractable to raise and lower the lifting arm. It has become common practice to incorporate a load cell in the lifting arm so that a patient supported by the lifting arm in a full body support sling can be weighed. The accuracy of the load cell depends on it maintaining a constant orientation. The problem is that the entire hoist bends forwards under the weight of the patient resulting in inaccurate readings from the load cell.

SUMMARY OF THE INVENTION

According to the present invention there is provided an invalid hoist comprising a mast, a lifting arm which can be raised and lowered by telescopically extending and retracting the mast and/or by raising and lowering a carriage, which supports the lifting arm, relative to the mast, and a load cell in the lifting arm for providing a signal representative of the weight of a person being lifted, the lifting arm being connected to the mast or the carriage by an arrangement which allows the lifting arm to be displaced angularly in a vertical plane against a resisting force in order to maintain the load cell in a constant orientation as a vertical load is applied to the lifting arm.

Preferably, the arrangement comprises first and second elongate guide tracks on the lifting arm (or on the mast or the carriage) and first and second elements on the mast or the carriage (or on the lifting arm) for co-operating with the first and second elongate guide tracks, the first guide track being above the second guide track and being inclined to the vertical in an upward forwards direction and the second guide track being inclined to the vertical in an upward rearwards direction.

In this latter case, the arrangement preferably comprises a pair of first elongate guide tracks and a pair of second elongate guide tracks, the two guide tracks of each pair being laterally spaced apart and typically being provided on opposite sides of the lifting arm (or on opposite sides of the mast or the carriage).

The guide tracks are preferably in the form of elongate slots or recesses. The elements which co-operate with the guide tracks are preferably rollers.

The resisting force is preferably provided by resilient means, typically a compression spring.

The invention will now be more particularly described, by way of example, with reference to the accompanying drawings.

BRIEF DESCRIPTION OF THE DRAWINGS

FIG. 2 is a side view of the carriage and lifting arm of the hoist shown in FIG. 1 with the lifting arm in an unloaded condition, FIG. 3 is a view similar to FIG. 2 but showing the lifting arm in an extreme loaded condition.

DESCRIPTION OF THE PREFERRED EMBODIMENT

Figure 1:
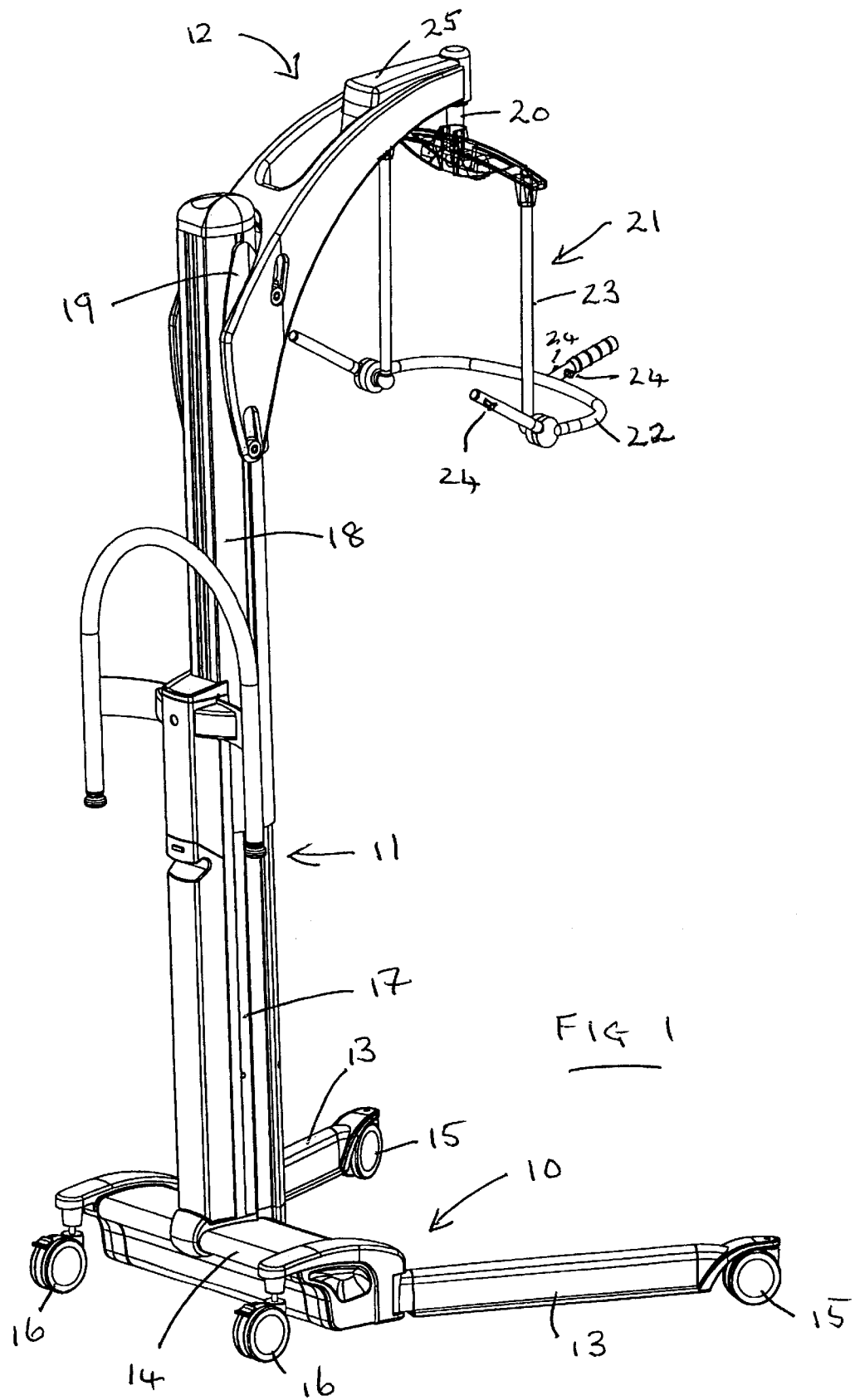
FIG. 1 is a perspective view of one embodiment of an invalid hoist according to the present invention.

Referring firstly to FIG. 1 of the drawings, there is shown therein an invalid hoist comprising a chassis 10, a mast 11 upstanding from the chassis 10 and a lifting arm 12.

The chassis 10 comprises two legs 13 and a cross member 14 connected between two legs 13 at one end thereof, The legs 13 are pivotable relative to the cross member 14 in order that they can be moved from a position in which they are in parallel spaced apart relationship to a position in which they diverge towards their forward ends in order that they can straddle a chair.

The free end of each leg is provided with a castor 15 and two further castors 16 are supported by the cross member 14, one at either end of the cross member.

The mast upstands from the centre of the cross member 14 and comprises a lower part 17 and an upper part 18 which is telescopically extendible and retractable relative to the lower part 17 in known manner.

A carriage 19 is provided on the upper mast part 18 for movement therealong also in known manner.

The lifting arm 12 is connected to the carriage 19 so that it can be raised and lowered by telescopic extension and retraction of the two mast parts 17 and 18 and by movement of the carriage 19 along the upper mast part 18.

The free end of the lifting arm 12 is provided with a spreader bar attachment 20 in the form of a spindle pivotable about a rigid vertical or substantially vertical axis.

A spreader bar 21 comprises a sling hanger 22 and a sling hanger support 23. The sling hanger support 23 which is of generally inverted U-shaped configuration, is attached to the spindle 20, and the sling hanger 22, which is of generally "Y" shaped configuration, is connected to the lower ends of the two arms of the sling hanger support 23 so as to be pivotable about a generally horizontal axis. The sling hanger 22 has four studs 24 for attachment of a full body support sling (not shown).

The lifting arm 12 incorporates a load cell (not shown) within a cover 25 for providing a signal representative of a weight of a person being lifted. The weight of the person is displayed on a display (not shown).

As stated previously, an accuracy of the load cell depends on it maintaining a constant orientation and a problem is that the entire hoist bends forwards under the weight of the patient resulting in inaccurate readings from the load cell.

In order to compensate for this, the lifting arm 12 is connected to the carriage 19 by an arrangement which allows the lifting arm to be displaced angularly in a vertical plane against a resisting force in order to maintain the load cell in a constant orientation.

Referring now to FIGS. 2 and 3 of the drawings, the arrangement comprises a pair of first elongate guide tracks 30 and a pair of second elongate guide tracks 31 on the lifting arm 12. The two guide tracks of each pair 30 and 31 are laterally spaced apart and aligned with one another in a horizontal direction and, ideally, are provided on opposite sides of the lifting arm 12. The guide tracks 30,31 are formed by elongate slots lined with hardened inserts. The first pair of guide tracks 30 is above the second pair of guide tracks 31 and each guide track 30 is inclined to the vertical in an upward forwards direction by an angle which in typically in, but not restricted to, the range 5–10°. Each of the lower second guide tracks 31 is inclined to the vertical in an upward rearwards direction by an angle which is typically in, but not restricted to, the range 5–100°.

The guide tracks 30 and 31 co-operate with elements 32 and 33, respectively, mounted on the carriage 19. These elements 32, 33 are preferably in the form of rollers, but they could take other forms as long as the guide tracks 30, 31 can slide over them.

FIG. 2 shows the rollers 32 and 33 at the lowermost ends of the guide tracks 30 and 31, respectively. The lifting arm 12 is urged into this position by resilient means, typically in, but not restricted to, the form of a compression spring 34. The lifting arm 12 will adopt this position relative to the carriage 19 when in an unloaded condition, i.e. when the sling hanger 22 does not support a patient.

As a downward load is applied to the sling hanger 22, the lifting arm 12 will move relative to the carriage 19 so that the guide slots 30 and 31 of the lifting arm 12 move downwards relative to the rollers 32 and 33, respectively. This causes the lifting arm 12 to be displaced rearwardly in the region of the upper guide slots 30 and forwardly in the region of the lower guide slots 31. This will result in angular displacement of the lifting arm 12 in a counterclockwise direction as viewed in FIGS. 2 and 3 thus compensating for the bending of the lifting arm 12 under load.

Movement of the guide slots 30 and 31 relative to the rollers 32 and 33, respectively, is resisted by the compression spring 34 and, therefore, the extent of movement will depend upon the weight of the person being lifted. FIG. 3 shows the lifting arm in an extreme loaded condition.

Figure 4:
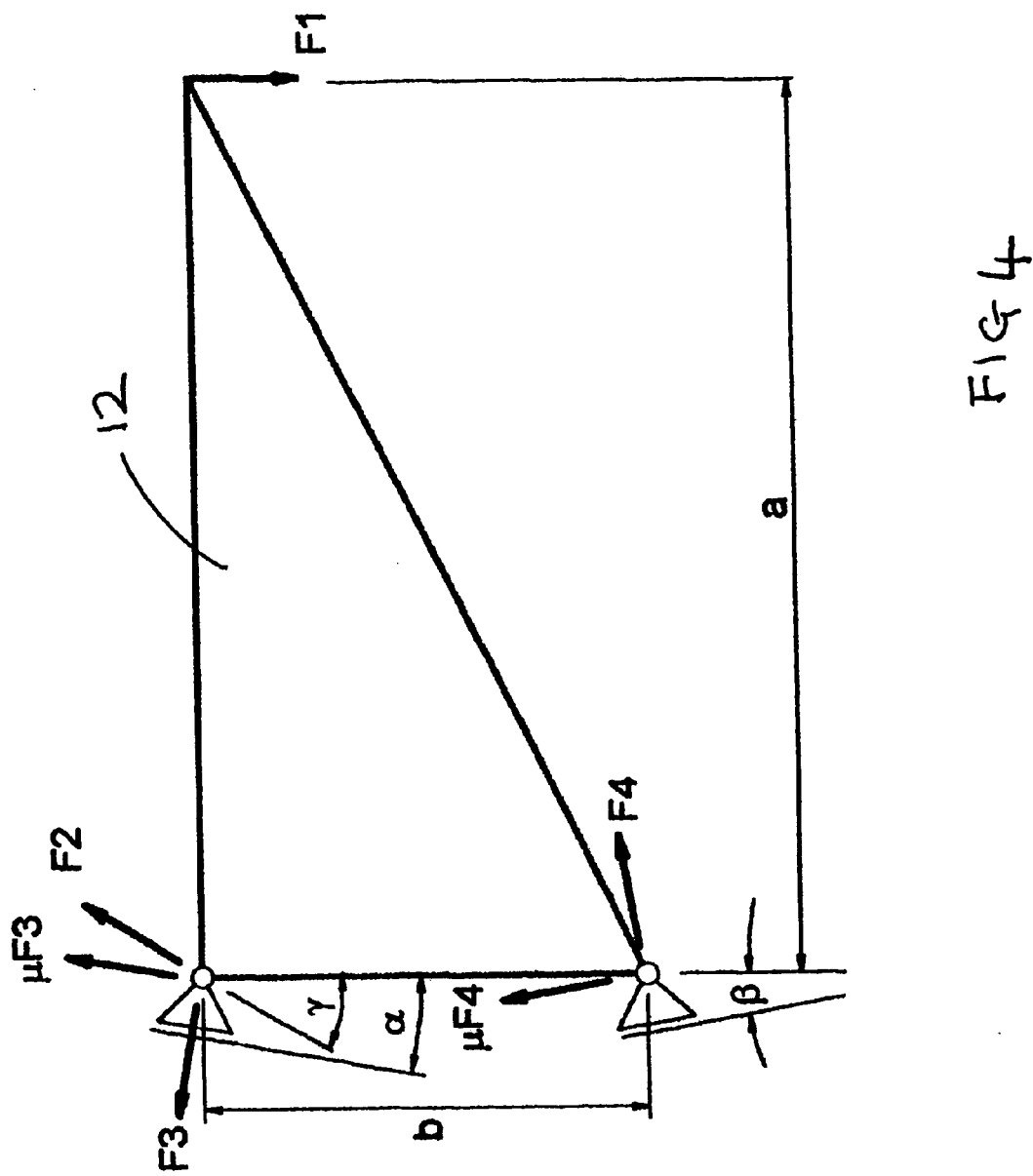
FIG. 4 is a schematic view of the geometry of the scale compensation arrangement and the reaction forces applied thereto.

Referring now to FIG. 4 of the drawings, the geometry of the scale compensation arrangement and the reaction forces applied thereto is shown.

Resulting force $F_2$, typically provided by the compression spring 34, which is necessary to achieve equilibrium of the mechanism depends on:

Load $F_1$,
A coefficient of friction between rollers and tracks $\mu$,
An angle $\alpha$ between the upper track and the vertical,
An angle $\beta$ between the lower track and the vertical,
An angle $\gamma$ between the vector of $F_2$ and the vertical
And dimensions a and b as follows:

$$F_2 = \frac{1 + \frac{a}{b}\left(\frac{A_2}{A_1} + \frac{B_2}{B_1}\right)}{\cos\gamma - \frac{A_2}{A_1} \cdot \sin\gamma} \cdot F_1$$

with
$A_1 = \mu \cdot \sin\alpha - \cos\alpha$;
$A_2 = \mu \cdot \cos\alpha + \sin\alpha$;
$B_1 = \mu \cdot \sin\beta - \cos\beta$;
$B_2 = \mu \cdot \cos\beta + \sin\beta$;

The compensation mechanism works according to the described principle if a result for the force $F_2$ is greater than zero ($F_2 > 0$). Reference $F_3$ indicates the force generated by roller 32 on the arm 12 when upper track 30 is at angle $\alpha$ to the vertical. Reference $F_4$ indicates the force generated by roller 33 on the arm 12 when lower track 31 is at angle $\beta$ to the vertical.

In the embodiment described above, the lifting arm 12 is connected to the carriage 19 which is movable along the telescopic mast 11. However, the lifting arm 12 could be connected directly to a telescopic mast by a scale compensation arrangement as described above. Also, the guide tracks 30 and 31 could be on the mast 11 or the carriage 19 and the elements 32 and 33 could be on the lifting arm 12.

The above embodiment is given by way of example only and various modifications will be apparent to a person skilled in the art without departing from the scope of the invention.

What is claimed is:

1. An invalid hoist comprising a mast, a lifting arm which can be raised and lowered by at least one of a) telescopically extending and retracting the mast and b) by raising and lowering a carriage, which supports the lifting arm, relative to the mast, and a load cell in the lifting arm for providing a signal representative of a weight of a person being lifted, the lifting arm being connected to the mast or the carriage by an arrangement which allows the lifting arm to be displaced angularly in a vertical plane against a resisting force in order to maintain the load cell in a constant orientation as a vertical load is applied to the lifting arm.

2. An invalid hoist as claimed in claim 1, wherein the arrangement comprises first and second elongate guide tracks on at least one of a) the lifting arm, b) the mast, and c) the carriage; and first and second elements on at least one of a) the mast, b) the carriage, and c) the lifting arm for co-operating with the first and second elongate guide tracks, the first guide track being above the second guide track and being inclined to the vertical in an upward forwards direction and the second guide track being inclined to the vertical in an upward rearwards direction.

3. An invalid hoist as claimed in claim 2, wherein the arrangement comprises a pair of first elongate guide tracks and a pair of second elongate guide tracks, the two guide tracks of each pair being laterally spaced apart.

4. An invalid hoist as claimed in claim 3, wherein the two guide tracks of each pair are provided on at least one of a) opposite sides of the lifting arm, b) opposite sides of the mast, and c) the carriage.

5. An invalid hoist as claimed in claim 2, wherein the guide tracks are in the form of elongate slots or recesses.

6. An invalid hoist as claimed in claim 2, wherein the elements which co-operate with the guide tracks are rollers.

7. An invalid hoist as claimed in claim 1, wherein the resisting force is provided by resilient means.

8. An invalid hoist as claimed in claim 7, wherein the resilient means is in the form of a compression spring.

9. An invalid hoist as claimed in claim 1, wherein the arrangement connects the lifting arm to the carriage which can be raised and lowered along at least part of the mast.

* * * * *